(12) United States Patent
Koetke et al.

(10) Patent No.: US 7,278,844 B2
(45) Date of Patent: Oct. 9, 2007

(54) EXTRUSION HEAD FOR BLOW MOLDING

(75) Inventors: Claus-Dieter Koetke, Bad Bodenteich (DE); Matthias Schindler, Henningen (DE)

(73) Assignee: Thermo-Technik-Systeme GmbH, Luder-Reinstorf (DE)

( * ) Notice: Subject to any disclaimer, the term of this patent is extended or adjusted under 35 U.S.C. 154(b) by 155 days.

(21) Appl. No.: 11/148,800

(22) Filed: Jun. 9, 2005

(65) Prior Publication Data

US 2005/0276876 A1    Dec. 15, 2005

(30) Foreign Application Priority Data

Jun. 9, 2004   (DE) ..................... 10 2004 028 100

(51) Int. Cl.
*B29C 47/22* (2006.01)

(52) U.S. Cl. ..................... 425/141; 425/381; 425/465; 425/466

(58) Field of Classification Search ................ 425/141, 425/150, 381, 465, 466
See application file for complete search history.

(56) References Cited

U.S. PATENT DOCUMENTS

| | | | | |
|---|---|---|---|---|
| 3,382,539 | A | * 5/1968 | Zehr | ........................ 425/191 |
| 3,535,739 | A | * 10/1970 | Mehnert | ....................... 425/168 |
| 3,601,851 | A | 8/1971 | Heidinger | |
| 4,472,129 | A | * 9/1984 | Siard | ........................... 425/381 |
| 4,551,087 | A | 11/1985 | Pan et al. | |
| 5,217,721 | A | * 6/1993 | Reifenhauser | .............. 425/72.1 |
| 6,354,828 | B1 | 3/2002 | Feuerherm | |
| 6,382,944 | B1 | * 5/2002 | Guillemette | ................. 425/113 |
| 6,902,388 | B2 | * 6/2005 | Guillemette et al. | ......... 425/190 |
| 2002/0136792 | A1 | 9/2002 | Guillemette et al. | |

FOREIGN PATENT DOCUMENTS

| | | |
|---|---|---|
| DE | 3505837 A1 | 8/1986 |
| DE | 19537132 C2 | 4/1997 |
| EP | 0075089 A2 | 3/1983 |
| EP | 0873845 A | 10/1998 |
| JP | 60105520 A | 6/1985 |

* cited by examiner

*Primary Examiner*—Robert Davis
*Assistant Examiner*—Joseph Leyson
(74) *Attorney, Agent, or Firm*—Edell, Shapiro & Finnan LLC

(57) ABSTRACT

A blow head for extruding a tubular plastic preform from an outlet gap between a fixed die core and a die body allows a change of the width of the outlet gap as a function of the circumference using light and small actuating devices, e.g., double-acting actuator cylinders, if the die body has its upper end, facing away from the outlet gap, pivotably mounted in the blow head and a pressure ring is positioned in the outlet gap, on which the actuating devices act.

19 Claims, 8 Drawing Sheets

EXTRUSION HEAD FOR BLOW MOLDING

CROSS REFERENCE TO RELATED APPLICATIONS

This application claims priority under 35 U.S.C. § 119 to German Application No. 10 2004 028 100.9 filed on Jun. 9, 2004, entitled "Extrusion Blow Head" the entire contents of which are hereby incorporated by reference.

FIELD OF THE INVENTION

The present invention relates to an extrusion head used in blow molding that produces a tubular preform made of plastic and, in particular, to an extrusion head including an adjustable outlet gap. The extrusion head may include a fixed die core and a die body, wherein a pressure ring and actuators are engaged to change the width of the outlet gap as a function of the circumference.

BACKGROUND

In the production of a tubular preform, the gap of the outlet between the die core and the die body determines the wall thickness of the hollow body tube that is subsequently manufactured from the tubular preform in a blow mold device. If the hollow body is a technical molded part having a longitudinal axis deviating from a straight line (i.e., the molded part has at least one curve in the longitudinal direction), a preform extruded with a constant wall thickness over its circumference results in the molded part having a greater wall thickness (i.e., material accumulation) in the region of the smaller radius of curvature, as well as a thinner wall thickness in the region of the larger radius of curvature.

Typically, however, to ensure a tube of an appropriate strength, the wall thickness may not fall below a minimum wall thickness value at any point of the hollow body. To stay above this minimum value, it is necessary to consume more plastic material in the manufacture of the tube, thereby increasing the weight of the finished hollow body. In addition, in the event of small radii of curvature, the finished hollow body may have wrinkles on the inside and transverse marks on the outside in the region of the smaller radius of curvature as a result of the material accumulation, through which both the technical function (e.g., as an air conduction channel) and the appearance of the article suffer.

An extrusion head having die body displaceable by small amounts along a plane perpendicular to the longitudinal axis of the die core, wherein the head is configured to achieve a linear, stretched exit of the preform out of the outlet gap having a constant wall thickness around its circumference (and not a targeted setting of a varied wall thickness of the preform as a function of the circumference) is known from DE-A-21 28 901. For this purpose, the die body has a flange ring, positioned along the side facing away from the outlet gap, configured for transverse displacement between an upper and a lower retaining ring of the blow head. The flange ring is enclosed by a displacement ring, which is provided outside the extrusion blow head with two eyes (offset by 90° from each other) engaged by two pivotable arm levers connected via spindle drives. In this construction, great force is required to transversely displacement the die body in relation to the die core, because the force is introduced at the upper end of the die body, i.e., in a region in which the plastic melt is still under very high pressure (the plastic melt does exit out of the outlet gap practically without pressure, but has a pressure of 400 to 500 bar at the entry point into the blow head in current machines).

In addition, an extrusion blow head having a die body displaceable in two orthogonal directions using two eccentrically mounted displacement rings that enclose the die body, as well as levers engaging thereon, but is adapted to achieve a varied wall thickness of the preform as a function of the circumference is known from DE-C-195 37 132. This configuration, however, suffers from the same disadvantage discussed above, namely, it requires great force to displace the die body at a significant distance from the outlet gap.

OBJECTS AND SUMMARY

An object of the present invention is to provide an extrusion head used in blow molding wherein the change of the width of the outlet gap as a function of the circumference requires significantly less force and, accordingly simpler, smaller, and lighter actuation devices than in the known constructions.

This object is achieved according to the present invention by providing a blow head having a die body mounted so it is pivotable within the blow head. In comparison to a translational adjustment of the die body, this has the advantage of requiring significantly less plastic mass that must be displaced. Consequently, smaller actuating forces are necessary and the actuators are simpler, smaller, and lighter. The parts of the blow head which absorb the forces may also be implemented having lower wall thicknesses. The smaller space requirement allows the use of the present invention even in machines having multiple blow heads.

The actuating forces are especially small if, according to the preferred embodiment, the die body is mounted so it is pivotable in the blow head at its upper end (i.e., the end facing away from the outlet gap), and the pressure ring is positioned near the outlet gap.

The die body preferably has an external surface shaped like a spherical cap for its pivotable mounting, which is received in a complementary bearing shell in the blow head.

In addition, the die body may comprise an upper section having an external surface shaped like a spherical cap and a lower section connected to the upper section such that it is removable. Consequently, to refit the blow head for extruding a plastic preform having a different diameter and/or different wall thickness, the complete die body does not have to be replaced, but rather only its lower section.

In one embodiment of the invention, the bearing shell in the blow head may comprise a ball socket upper part and a ball socket lower part. Such a configuration is advantageous from the standpoint of manufacturing.

The actuators engaging the pressure ring may comprise hydraulic cylinders. Preferably, a minimum of three hydraulic cylinders offset by 120° from one another around the circumference are used. More preferably, four hydraulic cylinders are used, each two of which lie opposite in pairs, the two pairs being offset by 90° from one another.

At least two displacement sensors offset by 90° from one another around the circumference are assigned to the die body and used to determine the actual position of the die body. Each of the displacement sensors may comprise a feeler pin spring-loaded in the direction of the pressure ring and displaceable in respective cylinder holders.

The distribution and change of the wall thickness in relation to the circumference of the preform is oriented to the geometry of the hollow body subsequently blown full in the blow mold, and therefore typically changes over the length of the extruded preform. For this reason, the actuators are controlled via a computer, which receives the output signals of the displacement sensors and controls the actuators according to a predefined program as a function of the actual value signals of the displacement sensors.

The computer is typically a component of a machine controller which, among other things, may change the wall thickness of the preform as a function of its length during its extrusion according to a predefined program, through peripherally-symmetric change of the width of the outlet gap, i.e., by raising or lowering the die body in relation to the conical die core.

In an especially advantageous embodiment, the actuators comprise double-acting actuators and transmit pressure and tensile forces to the die body. Therefore, two actuators suffice for pivoting the die body so that the pressure ring is no longer clamped orthogonally. In comparison to the embodiment having four single-acting actuator cylinders, for example, the force necessary for pivoting is reduced by the absolute value transmitted by the diametrically opposite actuator cylinder onto the pressure ring and, in addition, by the orthogonal friction forces. The actuators used, therefore, may be smaller and lighter. Hydraulic cylinders or spindle drives are particularly suitable as actuators.

In order to decouple the movements of the actuators as much as possible, the actuators may be suspended in a plane which is orthogonal to the die core axis and which runs through the pivot point of a pivot bearing. This allows the die body to be pivoted in a plane using only one actuator. To avoid constraining forces, the actuators may be mounted in an articulated way on both ends.

The use of ball and socket bearings, comprising a spherical segment in a bearing shell shaped like a spherical cap, which are known per se, is especially advantageous.

Another embodiment of the invention operates according to the principle of wedge adjustment. In wedge adjustment, the die body is pivoted through the simultaneous insertion of a first wedge on one side, and the anti-parallel removal of a second wedge having a diametrically opposed relationship to the first wedge. Both wedges are guided synchronously, so that the pressure ring is not clamped.

In still another embodiment of the invention, the die body may be pivoted using cams which roll off one another. The sliding and frictional movement, which results in material abrasion, is replaced in the wedge adjustment through rolling.

The above and still further objects, features and advantages of the present invention will become apparent upon consideration of the following detailed description of specific embodiments thereof, particularly when taken in conjunction with the accompanying drawings wherein like reference numerals in the various figures are utilized to designate like components.

BRIEF DESCRIPTION OF THE DRAWINGS

The drawings show an embodiment of a connector in accordance with the invention in a schematic view and in a longitudinal sectional view, wherein like reference numerals in the various figures are utilized to designate like components, and wherein.

DETAILED DESCRIPTION

Figure 1:
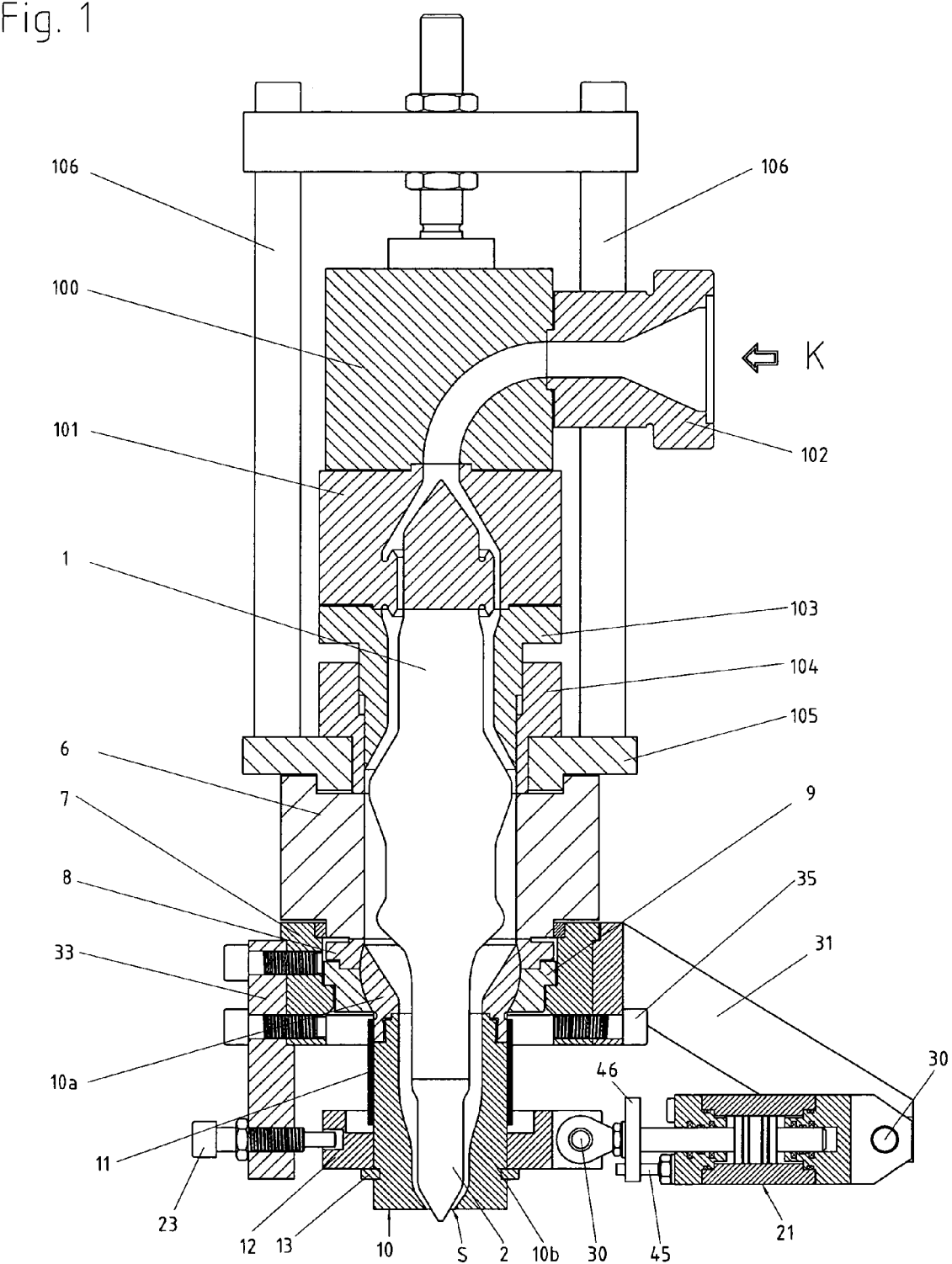
FIG. 1 illustrates a cross-sectional side view of an extrusion head according to an embodiment of the invention.
Figure 2:
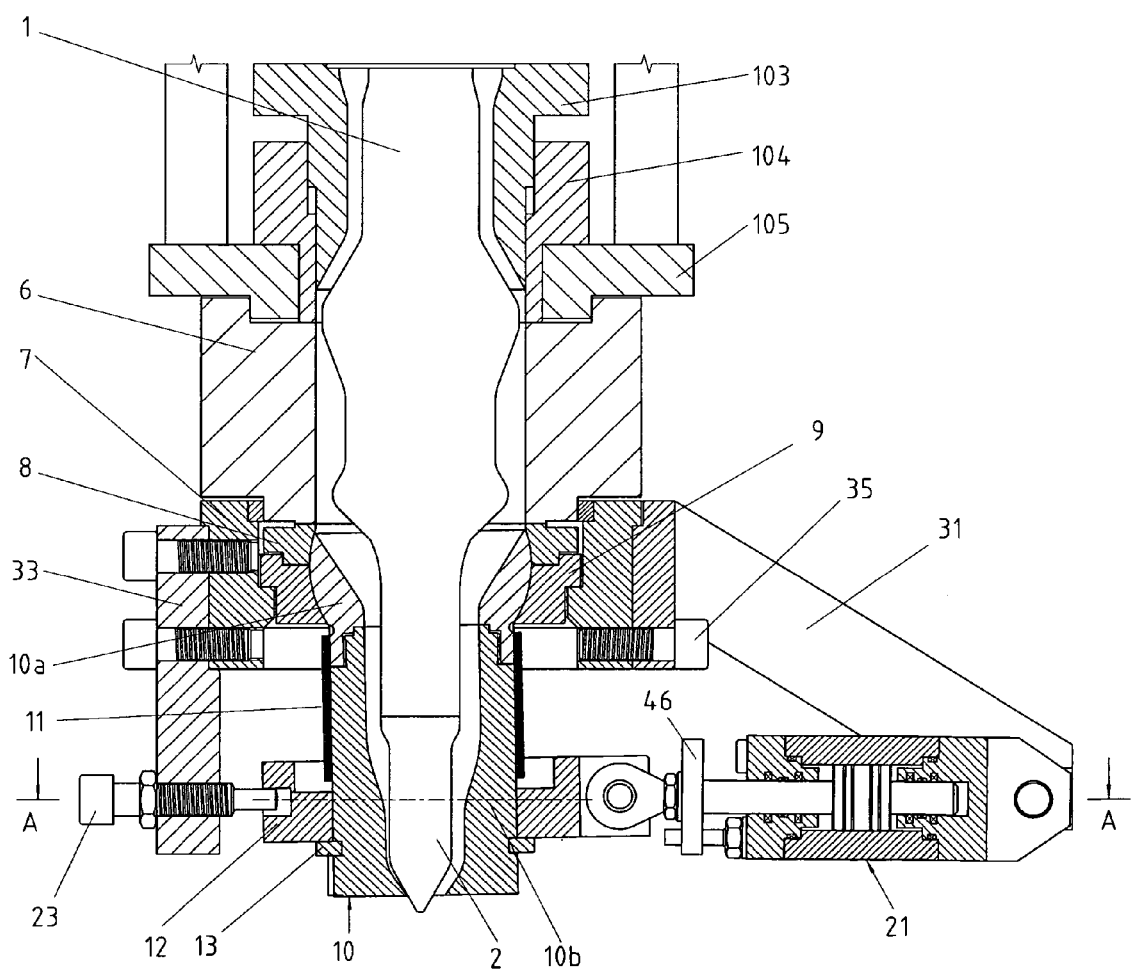
FIG. 2 illustrates a close-up view of the die body and core of FIG. 1, showing the die body pivoted with respect to the core.

An extrusion head device according to an embodiment of the invention is explained with reference to FIGS. 1-4. As shown, the device includes a fixed head portion 100 coupled to a core carrier 101 supporting a core holder 1. The flow of melted plastic (indicated by arrow K) is supplied (at a pressure of several hundred bar) from a typical extruder to the space enclosing the core carrier 101 via an adapter 102 and a channel in the head portion 100. A guide ring 103 is secured to the bottom of the core carrier 101. A guide bushing 104, seated on the guide ring 103, is connected to a baseplate 105. The baseplate 105 may be raised and lowered in any conventional manner. For example, guide rods 106 may be used for setting and adjusting the wall thickness of the tubular preform extruded out of the blow head, ideally uniformly around the circumference.

The baseplate 105 supports additional parts of the blow mold. Specifically, a housing 7 may be attached to the baseplate 105 via an intermediate ring 6. The housing 7 may enclose and support a ball socket upper part 8 and a ball socket lower part 9. The upper and lower ball socket parts 8, 9 together form an annular, peripheral bearing shell for a die body 10. The die body 10 may comprise an upper section 10a and a lower section 10b. The upper section has an external surface shaped like a spherical cap configured to be received in the bearing shell 8, 9. The lower section 10b, moreover, may be removably connected to the upper section 10a. The die body 10 may be surrounded about its periphery by a heating strip 11. The die lower section 10b encloses a die core 2, which is connected to the core holder 1 such that it may be removed. An outlet gap S remains between the die core 2 and the die body lower section 10b.

The width of the gap S (and thus the thickness of a tube wall) can be adjusted independently of the circumference by raising or lowering the baseplate 105 using the rods 106. In addition, the width of the gap S can be changed as a function of the circumference by pivoting the die body 10 in its bearing shell (as formed by the upper and lower ball socket parts 8, 9). To pivot the die body 10, a pressure ring 12 is seated on the lower section 10b of the die body 10, near its lower end and is fastened by a retaining ring 13. Double-acting actuator cylinders 21 and 22 (actuator cylinder 22 best seen in FIG. 3) engage the pressure ring 12. The actuator cylinders 21, 22 are each supported on a holder 31 and are connected to the ring through pivot bearings 30. The cylinders 21, 22 may be hydraulic, with the pistons of the cylinders 21, 22 having fluid applied to them via valves (not shown) controlled by the computer of a machine controller (not shown) to achieve courses of the width of the outlet gap S that change as a function of the circumference.

Figure 3:
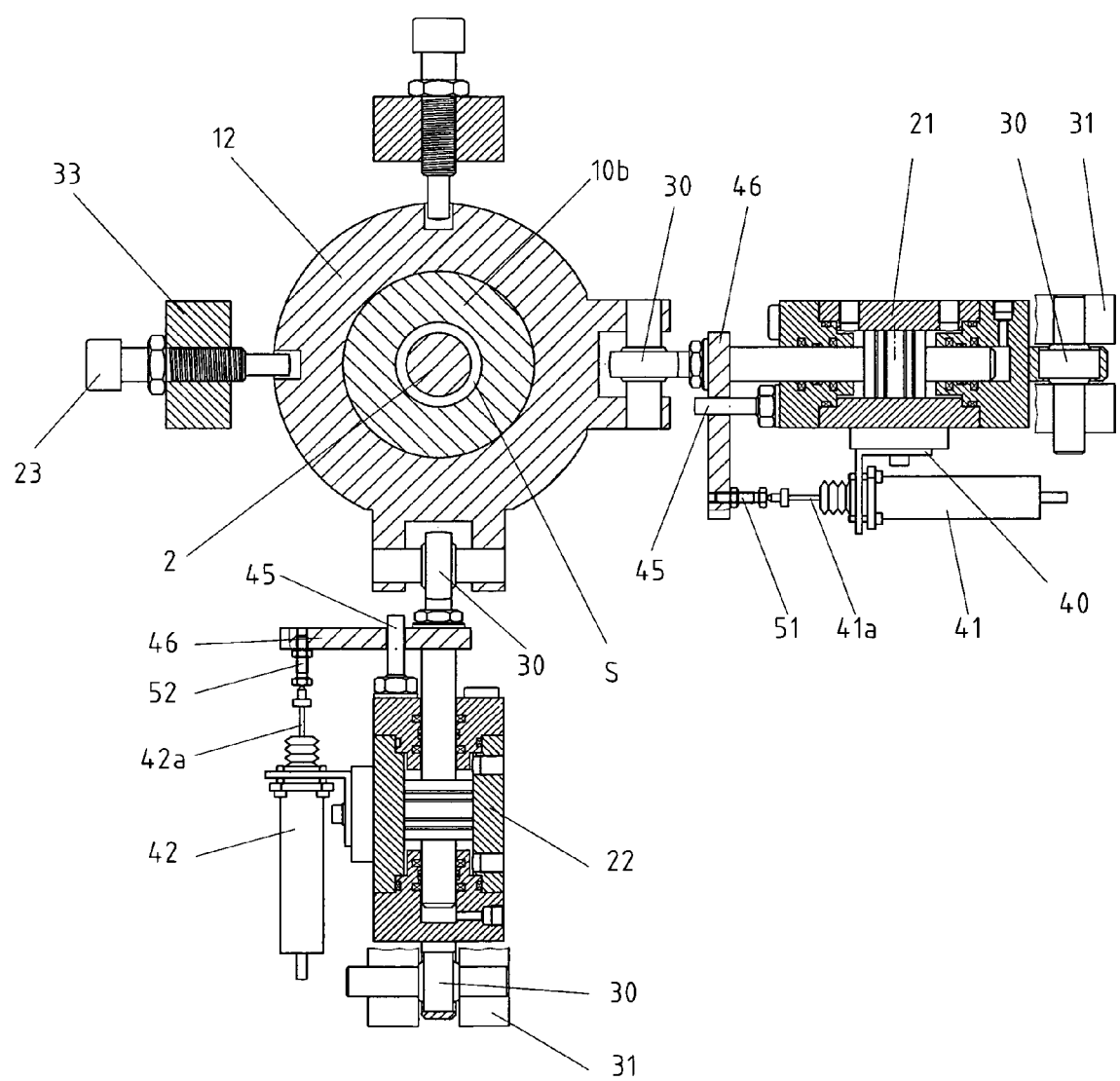
FIG. 3 illustrates a bottom view of the extrusion head of FIG. 1.

The particular, actual position of the die body 10 is measured using displacement sensors 41 and 42 (best seen in FIG. 3). The displacement sensors 41, 42 send signals to the machine controller. The sensors 41, 42 and/or the computer compare the actual values to the setpoint values contained in a stored program as a function of the particular extruded length of the preform, and regulate the position of the die body 10 in relation to the die core 2 during the extrusion of the preform out of the gap S by activating the hydraulic valves so that the preform has the predefined course of the wall thickness around the circumference at every point, in addition to the aforementioned, conventional manner of varying wall thickness by raising or lowering the die body 10 using the rods 106.

The cylinder holder 31 may be fastened to the housing 7 using a screw 35. As indicated above, the actuator cylinder 21 is supported by a pivot bearing 30, and is located between the cylinder holder 31 and the pressure ring 12. Each cylinder holder 31 includes a guide pin holder 33 supporting an adjustable guide pin 23. Each guide pin 23 is secured to the side of the housing 7 such that the pin is diametrically opposed to the cylinder holder 31. The guide pin 23 may be axially displaced along a recess of the pressure ring 12. The guide pin 23 and recess structure prevent twisting of the die body 10, as well as prevent damage to the die body 10 or the die core 2 since it simultaneously forms a stop. With this configuration, the die body 10 can be pivoted in a desired direction and to any desired degree. For example, in FIG. 2 the die body 10 is shown pivoted to the right.

Figure 4:
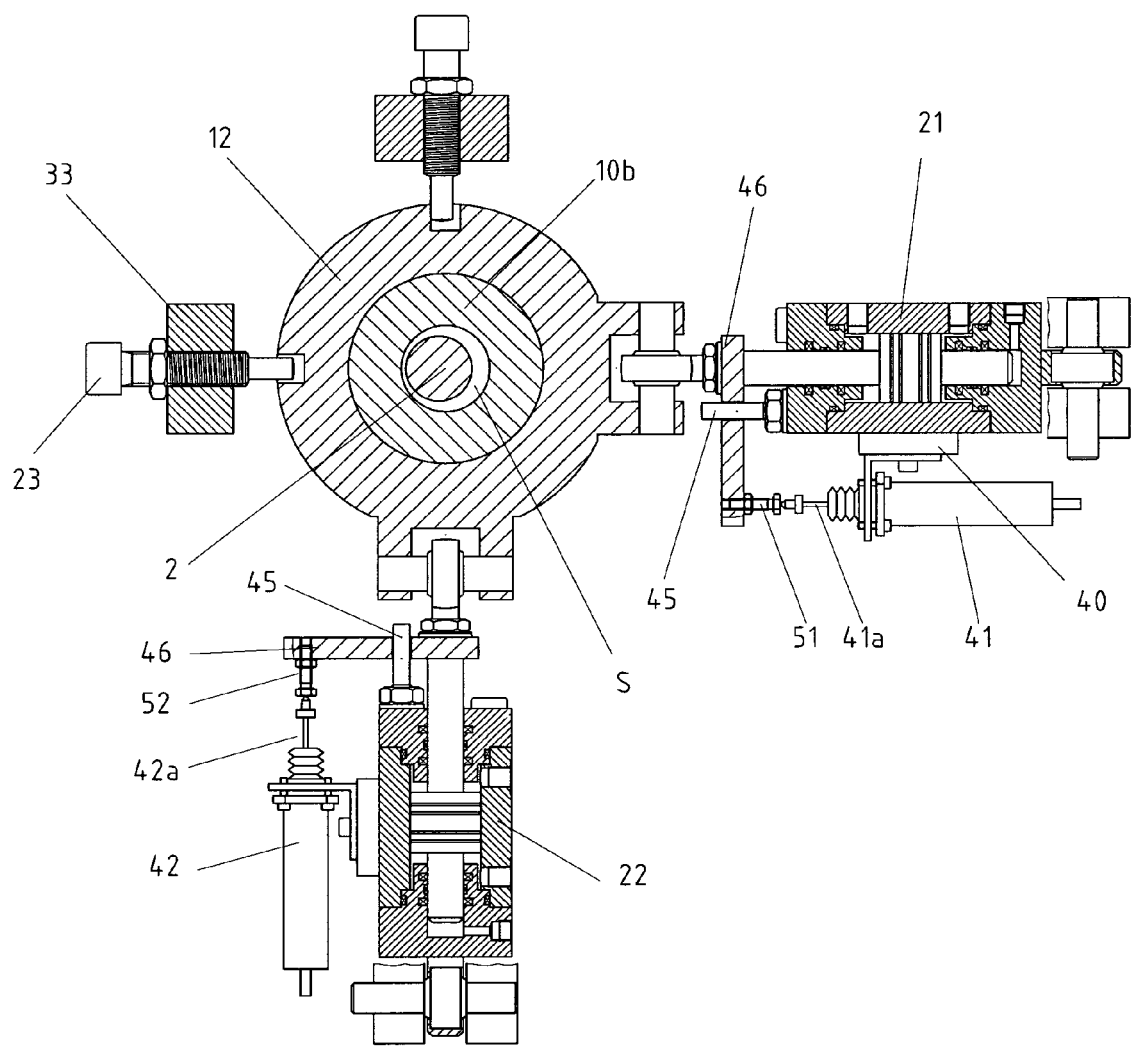
FIG. 4 illustrates the extrusion head of FIG. 3, showing the die body pivoted with respect to the core.

Referring to FIG. 3, the double-acting actuator cylinders 21, 22 (positioned such that they are offset by 90°) and the guides 23 positioned diametrically opposite each of their respective cylinder are shown. Commercially available displacement sensors 41, 42 may be connected to the actuator cylinders 21, 22 using an angled support (not shown in FIG. 3, referenced as 40 in FIG. 6). Each of the displacement sensors 41, 42 may comprise a displaceable feeler 41a, 42a that presses against a respective feeler pin 51, 52 attached to the piston rod via a feeler pin holder 46. The feeler pin holders 46 are each penetrated by a pin 45 (seen in FIG. 1). The pins 45 are each attached to an actuator cylinder 21, 22 and guide the feeler pin holders 46. With this configuration, the die body 10 may be pivoted in a desired direction and to any desired degree, as illustrated in FIG. 4.

Figure 5:
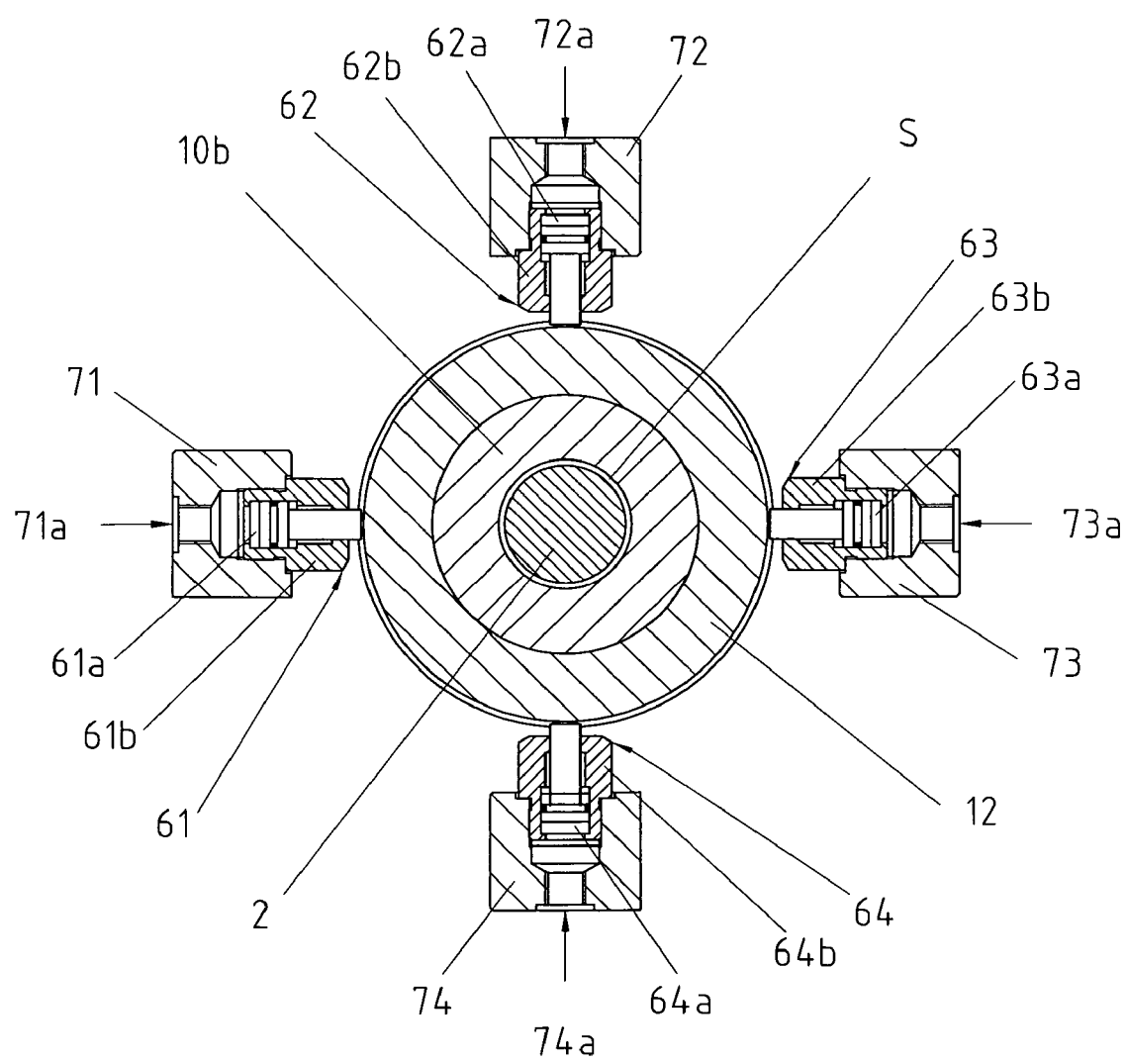
FIG. 5 illustrates a cross-sectional bottom view of an extrusion head according to another embodiment of the invention.

FIG. 5 shows an embodiment in which the radially oriented actuating forces are produced using small, single-acting actuator cylinders 61, 62, 63, and 64 that are offset from each other by 90° around the circumference of the pressure ring 12 such that two diametrically opposed pairs are created. Each actuator cylinder 61, 62, 63, 64 comprises a piston 61a, 62a, 63a, 64a, respectively, whose piston rod has its free end pressed against the pressure ring 12. The piston 61a, 62a, 63a, 64a is seated in a respective cylinder housing 61b, 62b, 63b, 64b fastened (e.g., by a screw) to a respective cylinder holder 71, 72, 73, 74. Each cylinder holder 71, 72, 73, 74 includes connection holes 71a, 72a, 73a, 74a, respectively, for applying hydraulic fluid to the pistons 61a, 62a, 63a, 64a.

Figure 6:
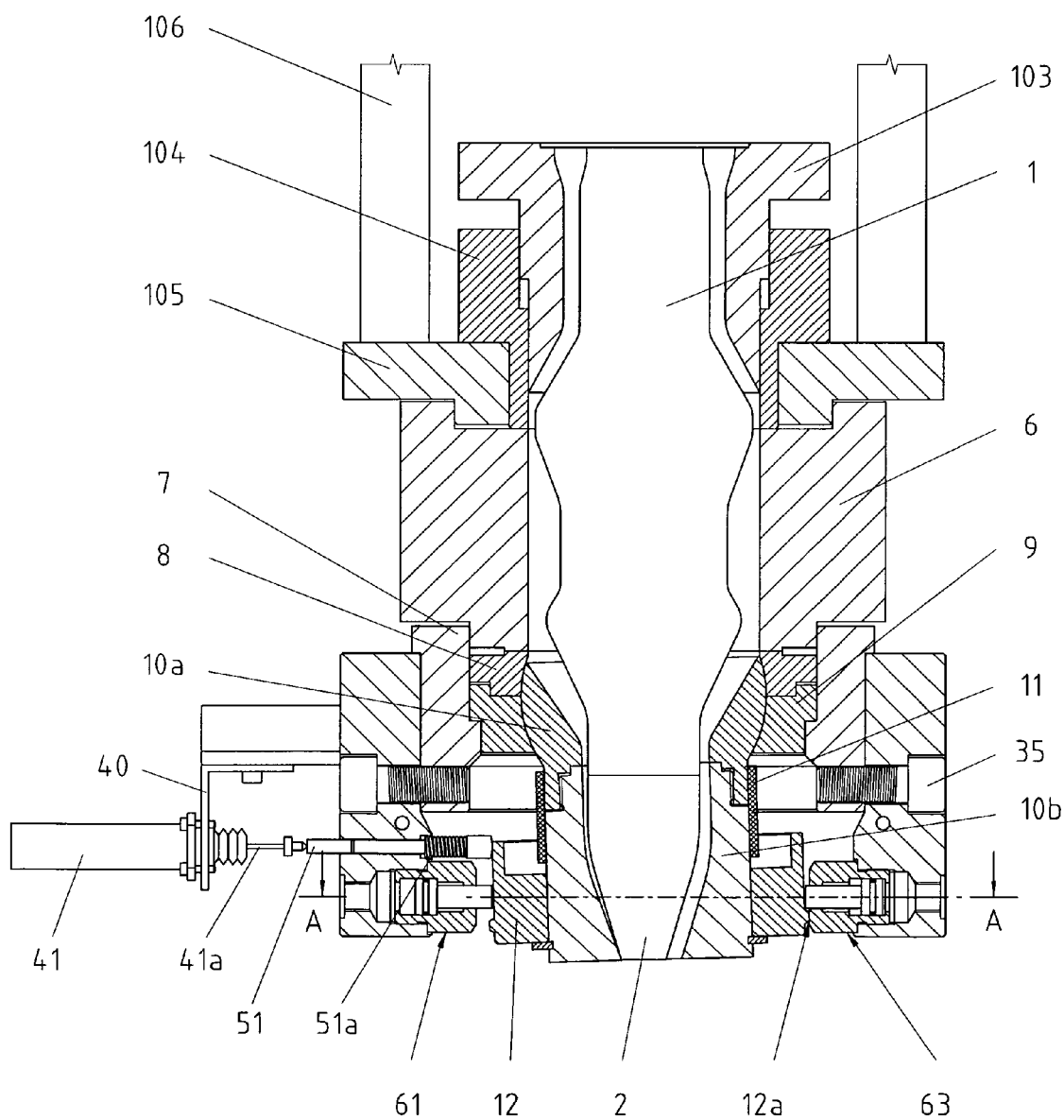
FIG. 6 illustrates a cross-sectional, side view of the extrusion head of FIG. 5.

Referring to FIG. 6, the width of the outlet gap S results from a maximum adjustment of the die body 10 in relation to the die core 2 and increases as a function of the circumference, from almost zero to a maximum value and then decreases again to nearly zero. To delimit the maximum adjustment path of the die body 10, the pressure ring 12 has an annular bead 12a, which presses against the relevant cylinder (in FIG. 6, it presses against cylinder 61) at the end of the adjustment path in order to avoid damage to the die body 10 caused by its striking the die core 2. Displacement sensors (only one displacement sensor 41 is shown in FIG. 6) may also be provided for each cylinder 61, 62, 63, 64. Preferably, at least two sensors are provided. The displaceable feeler 41a illustrated presses against its feeler pin 51, which is guided into the cylinder holder and whose other end is held against the mantle of the pressure ring 12 using a coiled spring 51a.

Figure 7:
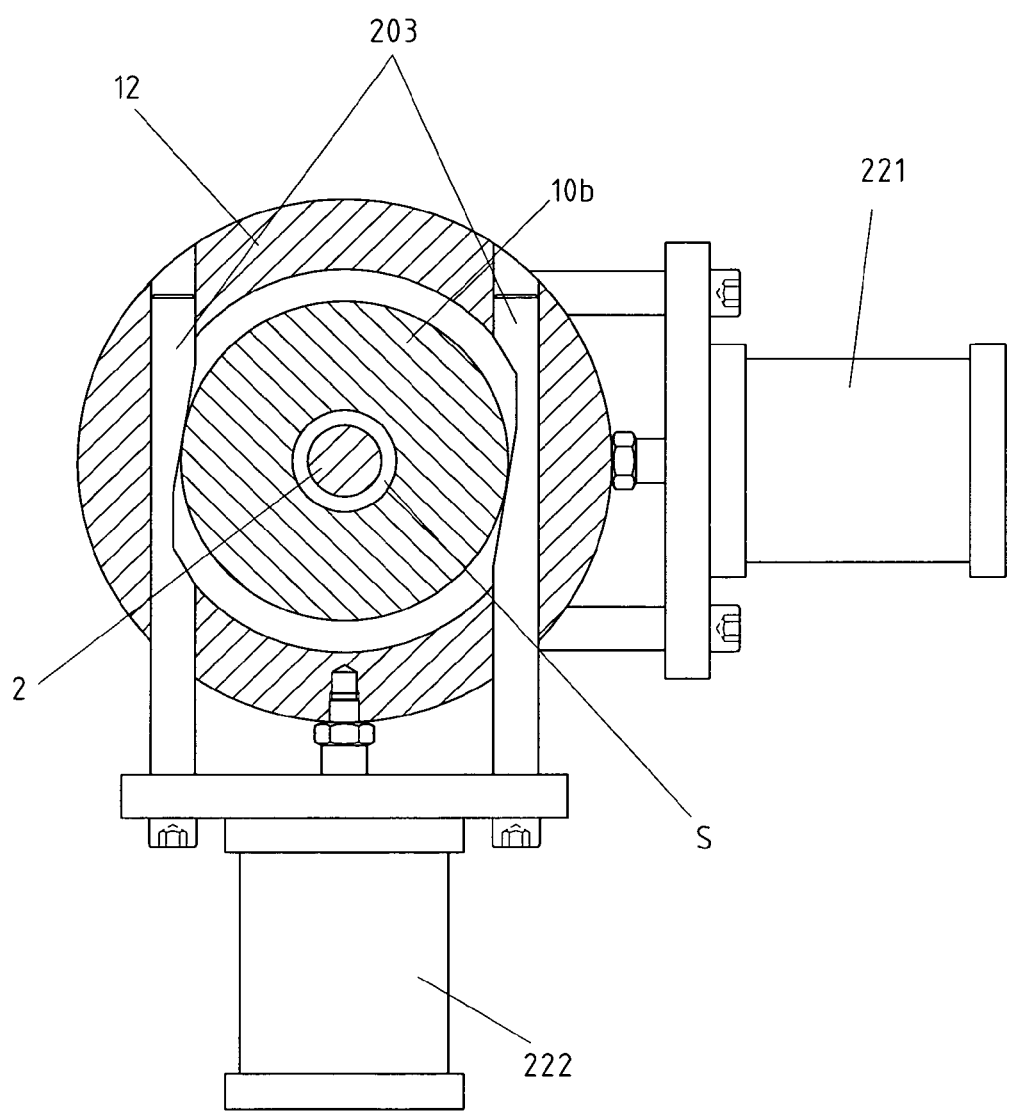
FIG. 7 illustrates a partial cross-sectional view of an extrusion head according to another embodiment of the invention, showing a wedge adjustment.

FIG. 7 illustrates an extrusion head according to another embodiment of the present invention, showing the pivoting of the die body 10 using wedge adjustments. As shown, two double-acting hydraulic cylinders 221 and 222 (offset from each other by 90°) may generate the radial forces necessary to adjust the die body 10 via its lower section 10b. These radial forces are transmitted using two rod pairs 203 between which the die body 10 is seated. The force is transmitted according to the wedge principle. Specifically, each rod pair has recesses on its interior shaped punctually symmetric to the axis of symmetry of the die body 10, so that the interiors of the rods 203 form opposing wedge pairs. In operation, the die body 10 is pivoted through the simultaneous insertion of a first wedge on one side, and the anti-parallel removal of a second wedge having a diametrically opposed relationship to the first wedge. Both wedges are guided synchronously, so that the pressure ring is not clamped.

Figure 8:
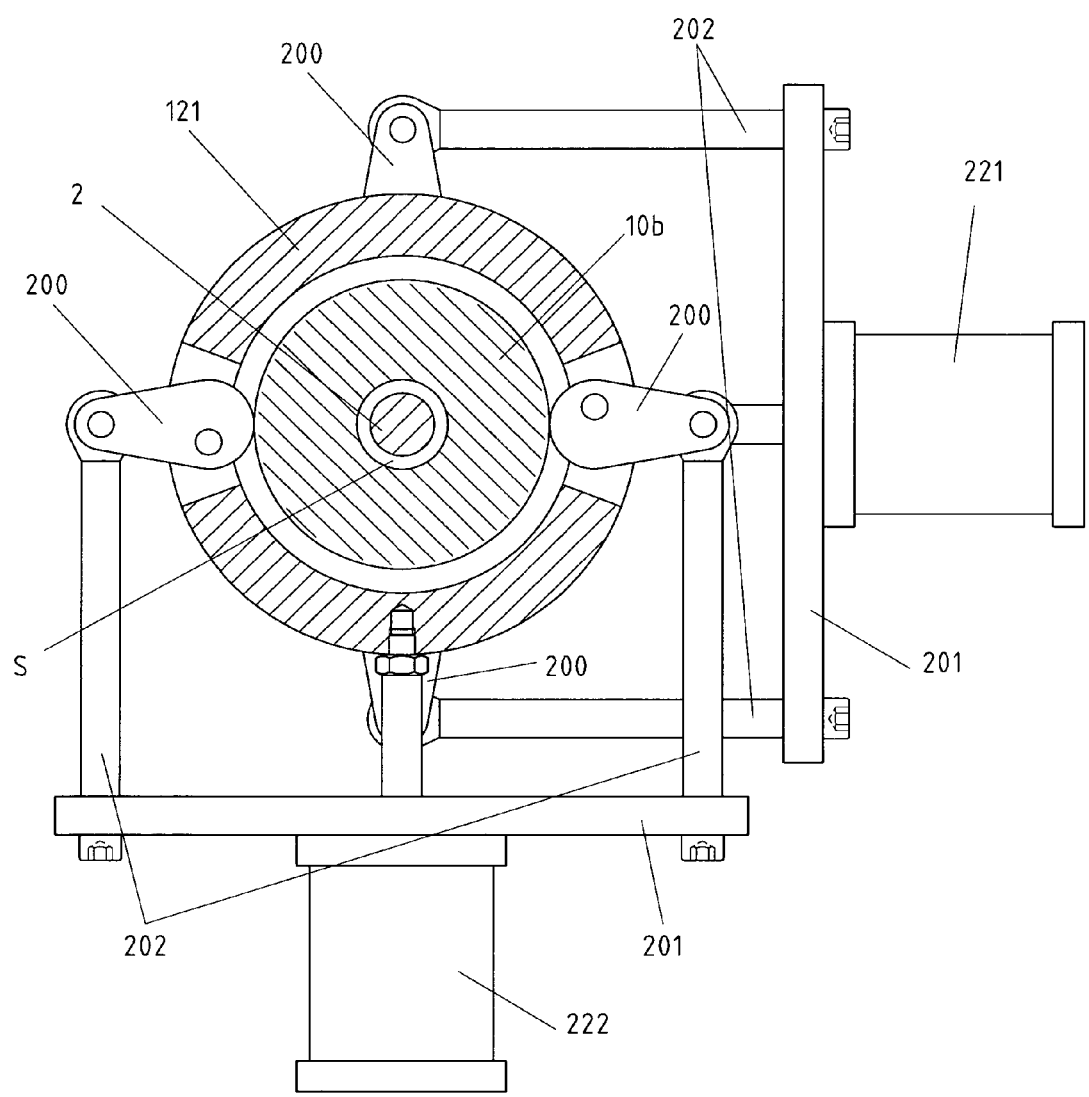
FIG. 8 illustrates a partial cross-sectional view of an extrusion head according to another embodiment of the invention, showing a cam adjustment.

FIG. 8 illustrates an extrusion head according to another embodiment of the present invention, showing a cam adjustment mechanism. As shown, the extrusion head includes four mounted cams 200 set such that two diametrically opposed cam pairs are formed (the cams 200 are positioned such that each is offset by 90°). The cams 200 are rotatably attached to a fixed pressure ring 121 and are configured to roll oppositely in tandem on the die body lower section 10b. The cams 200 may be generally egg-shaped and are mounted eccentrically. The cam pairs are each twisted by a double-acting hydraulic cylinder 221, 222 using one rod pair 202 each. Each rod pair 202 is connected to the housing of one of each of the hydraulic cylinders 221, 222 through a spacer 201. The piston rods of the hydraulic cylinders 221 and 222 are fixed on the pressure ring 12.

While the invention has been described in detail and with reference to specific embodiments thereof, it will be apparent to one skilled in the art that various changes and modifications can be made therein without departing from the spirit and scope thereof. Accordingly, it is intended that the present invention covers the modifications and variations of this invention provided they come within the scope of the appended claims and their equivalents.

What is claimed is:

1. A blow head for extruding a tubular plastic perform, comprising:
   a fixed die core having an axis;
   a die body in spaced relation to the die core, the die body configured to pivot about a pivot point;
   an outlet gap defined by the space between the fixed die core and the pivoting die body, the outlet gap having a width; and
   a pressure ring engaged by at least one actuator, wherein the pressure ring is operable to pivot the die body to change the width of the outlet gap as a function of the circumference of the die body.

2. The extrusion blow head according to claim 1, wherein:
   the die body includes an upper section and a lower section;
   the die body upper section is pivotably mounted to the extrusion head;
   the outlet gap is located at the lower section; and
   the pressure ring is positioned near the outlet gap.

3. The extrusion blow head according to claim 1, further comprising a bearing shell configured to receive the die body, wherein the die body comprises an external surface having a generally spherical shape to enable its pivotable mounting.

4. The extrusion blow head according to claim 3, wherein the bearing shell comprises a ball socket lower part and a ball socket upper part.

5. The extrusion blow head according to claim 1, wherein the die body comprises an upper section having an external surface with a generally spherical shape; and a lower section removably connected to the upper portion.

6. The extrusion blow head according to claim 1, wherein the at least one actuator configured to engage the pressure ring comprises four hydraulic cylinders, each two of which lie diametrically opposite in pairs, the two pairs being offset by 90° from one another.

7. The extrusion blow head according to claim 1, further comprising at least two displacement sensors assigned to the die body, wherein the sensors are offset around the circumference by 90° from one another.

8. The extrusion blow head according to claim 7, wherein each displacement sensor comprises a cylinder holder and a feeler pin spring-loaded in the direction of the pressure ring and displaceably mounted in the cylinder holder.

9. The extrusion blow head according to claim 7, wherein the displacement sensors generate output signals and the extrusion head further includes a computer operable to receive the output signals and control the actuators according to a predefined program as a function of the actual value signals of the displacement sensors.

10. The extrusion blow head according to claim 1, wherein the at least one actuator comprises at least one double-acting actuator.

11. The extrusion blow head according to claim 10, wherein the double-acting actuator comprises a double-acting hydraulic cylinder.

12. The extrusion blow head according to claim 10, wherein the double-acting actuator comprises a spindle drive.

13. The extrusion blow head according claim 1, further comprising a suspension operable to suspend the at least one actuator, the suspension being located in a plane that is orthogonal to the die core axis and which runs through the pivot point.

14. The extrusion blow head according to claim 13, wherein the suspension comprises a pivot bearing.

15. The extrusion blow head according to claim 10, further comprising:
    two wedge profiles having parallel wedge surfaces, wherein:
    the die body comprises an upper section and a lower section;
    the at least one double-acting actuator displaces the two wedge profiles in the same direction; and
    the parallel wedge surfaces press against two diametrically opposite sides of the die body lower section to pivot the die body.

16. The extrusion blow head according to claim 10, wherein:
    the die body comprises an upper section and a lower section; and
    the at least one double-acting actuator twists two eccentrically mounted cams configured to roll mutually on diametrically opposite sides of the die body lower section at the same time to pivot the die body.

17. The extrusion blow head according to claim 1, wherein the actuator is pivotably connected to the pressure ring via a pivot bearing.

18. A blow head for extruding a tubular plastic perform comprising:
    a fixed die core having an axis;
    a die body in spaced relation to the die core, the die body configured to pivot about a pivot point;
    an outlet gap defined by the space between the fixed die core and the pivoting die body, the outlet gap having a width;
    a pressure ring engaged by at least one actuator, wherein the pressure ring is operable to pivot the die body to change the width of the outlet gap as a function of the circumference of the die body;
    a housing enclosing a bearing shell, the bearing shell comprising a spherical upper portion and lower portion connected to the upper portion;
    at least one cylinder holder coupled to the housing; and
    a hydraulic cylinder coupled to the cylinder holder, wherein the hydraulic cylinder selectively engages the pressure ring.

19. The extrusion blow head according to claim 18, wherein hydraulic cylinder is coupled to the pressure ring via a pivot bearing.

* * * * *